(12) United States Patent
Carrott et al.

(10) Patent No.: US 11,580,467 B2
(45) Date of Patent: Feb. 14, 2023

(54) INTEGRATED SYSTEM FOR AND METHOD OF MATCHING, ACQUIRING, AND DEVELOPING HUMAN TALENT

(71) Applicant: CELECTIV LLC, Chicago, IL (US)

(72) Inventors: Gregory T. Carrott, Princeton, IL (US); Christine Virginia Wood, Chicago, IL (US); Anne Lisbet Ozaksut, Clarksville, TN (US)

(73) Assignee: CELECTIV LLC, Chicago, IL (US)

( * ) Notice: Subject to any disclaimer, the term of this patent is extended or adjusted under 35 U.S.C. 154(b) by 190 days.

(21) Appl. No.: 16/558,580

(22) Filed: Sep. 3, 2019

(65) Prior Publication Data
US 2020/0074381 A1  Mar. 5, 2020

Related U.S. Application Data

(60) Provisional application No. 62/726,591, filed on Sep. 4, 2018.

(51) Int. Cl.
*G06Q 10/06* (2012.01)
*G06Q 10/0631* (2023.01)
*G06Q 10/1053* (2023.01)

(52) U.S. Cl.
CPC .  *G06Q 10/063112* (2013.01); *G06Q 10/1053* (2013.01)

(58) Field of Classification Search
None
See application file for complete search history.

(56) References Cited

U.S. PATENT DOCUMENTS

| | | |
|---|---|---|
| 6,681,098 B2 | 1/2004 | Pfenninger et al. |
| 6,996,367 B2 | 2/2006 | Pfenninger et al. |
| 6,999,714 B2 | 2/2006 | Pfenninger et al. |

(Continued)

FOREIGN PATENT DOCUMENTS

JP    2012-069047 A    4/2012

OTHER PUBLICATIONS

Gerard H. Gaynor, "Making People Decisions," in Decisions: An Engineering and Management Perspective , IEEE, 2015, pp. 113-138, doi: 10.1002/9781119020264.ch6. (Year: 2015).*

(Continued)

*Primary Examiner* — Cory W Eskridge
(74) *Attorney, Agent, or Firm* — Panitch Schwarze Belisario & Nadel LLP

(57) ABSTRACT

A method for providing candidate recommendations for an open position based on problem solving proficiency and culture matching includes: receiving job posting data from a first computing system, the job posting data including employer culture markers and job criteria values; receiving candidate information for a candidate, the candidate information including candidate culture markers, text submissions, and candidate values; determining a culture match score by comparing the employer culture markers against the candidate culture markers; determining a problem solving proficiency level for the candidate by applying a problem solving algorithm to the text submissions; and transmitting a hiring recommendation for the candidate to the first computing system based on the determined culture match score and problem solving proficiency level for the candidate and the criteria values.

14 Claims, 6 Drawing Sheets

(56) References Cited

U.S. PATENT DOCUMENTS

| | | |
|---|---|---|
| 7,606,778 B2 | 10/2009 | Dewar |
| 8,265,977 B2 | 9/2012 | Scarborough et al. |
| 8,429,092 B2 | 4/2013 | Bekerian et al. |
| 8,939,768 B2 | 1/2015 | LaPasta et al. |
| 9,842,314 B2 | 12/2017 | Polli et al. |
| 2006/0235884 A1 | 10/2006 | Pfenninger et al. |
| 2006/0265268 A1 | 11/2006 | Hyder et al. |
| 2008/0147630 A1 | 6/2008 | Chu |
| 2012/0072361 A1* | 3/2012 | Bekerian ............ G06Q 10/1053 705/321 |
| 2013/0253910 A1* | 9/2013 | Turner .................. G06F 40/253 704/9 |
| 2013/0268452 A1 | 10/2013 | MacEwen et al. |
| 2015/0127567 A1* | 5/2015 | Menon ................ G06Q 10/1053 705/321 |
| 2018/0218329 A1 | 8/2018 | Kadambala et al. |
| 2019/0114593 A1* | 4/2019 | Champaneria ...... G06F 16/3325 |
| 2019/0311331 A1* | 10/2019 | Steinhoff ............. G06V 40/103 |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Feb. 14, 2020, by the Japanese Patent Office in corresponding International Application No. PCT/US2019/049304. (10 pages).

\* cited by examiner

INTEGRATED SYSTEM FOR AND METHOD OF MATCHING, ACQUIRING, AND DEVELOPING HUMAN TALENT

FIELD

The present disclosure relates to providing candidate recommendations for an open position based on problem solving proficiency and culture matching, specifically the use of text submission analytics and comparative analysis to provide stronger candidate and position matching and recommendations.

BACKGROUND

When a business needs to hire new talent, the process typically involves making a new job posting, having that job posting made available to potential talent, receiving resumes for the potential talent, and then wading through stacks and stacks of resumes to attempt to identify talent that may be a good match for the business. To help assist businesses in this process, many systems have been developed that gather resumes from talent, parse data therefrom, and attempt to find matches based on keywords, education, or job experience. However, these tools often have inaccuracies. In addition, resumes often provide a very limited view of a potential hire; they may be able to determine if an individual is a match for the job itself in terms of work experience and education, but provide little to no insight as to a match of the individual with the business.

Thus, there is a need for a technical system that can assist in these determinations and thus have a considerably higher success rate in matching human talent to businesses.

SUMMARY

The present disclosure provides a description of systems and methods for providing candidate recommendations for an open position based on problem solving proficiency and culture matching. An open position is submitted that has criteria associated therewith, which is used to identify other, related positions. The criteria and experienced used in the other, related positions is used to enhance the criteria in the open position, to facilitate a stronger match. Additionally, candidates provide text submissions as well as values related to the matching of business and employee culture. The text submissions are analyzed for problem solving skills and the skills, when combined with the culture values, are used to create a stronger measure of matching between the candidate and the open position, which can be in turn used to provide a stronger recommendation of candidates for open positions and vice versa.

A method for providing candidate recommendations for an open position based on problem solving proficiency and culture matching includes: receiving, by a receiver of a processing server, job posting data from a first computing system, the job posting data including at least a plurality of employer culture markers and one or more job criteria values; receiving, by the receiver of the processing server, candidate information for a candidate, the candidate information including at least a plurality of candidate culture markers, one or more text submissions, and one or more candidate values; determining, by a processor of the processing server, a culture match score by comparing the plurality of employer culture markers against the plurality of candidate culture markers; determining, by the processor of the processing server, a problem solving proficiency level for the candidate by applying a problem solving algorithm to the one or more text submissions; and transmitting, by a transmitter of the processing server, a hiring recommendation for the candidate to the first computing system based on the determined culture match score and problem solving proficiency level for the candidate and the one or more job criteria values.

A system for providing candidate recommendations for an open position based on problem solving proficiency and culture matching includes: a first computing system; and a processing server, the processing server including a receiver receiving job posting data from the first computing system, the job posting data including at least a plurality of employer culture markers and one or more job criteria values, and candidate information for a candidate, the candidate information including at least a plurality of candidate culture markers, one or more text submissions, and one or more candidate values, a processor determining a culture match score by comparing the plurality of employer culture markers against the plurality of candidate culture markers, and determining a problem solving proficiency level for the candidate by applying a problem solving algorithm to the one or more text submissions, and a transmitter transmitting a hiring recommendation for the candidate to the first computing system based on the determined culture match score and problem solving proficiency level for the candidate and the one or more job criteria values.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Providing Candidate Recommendations

Figure 1:
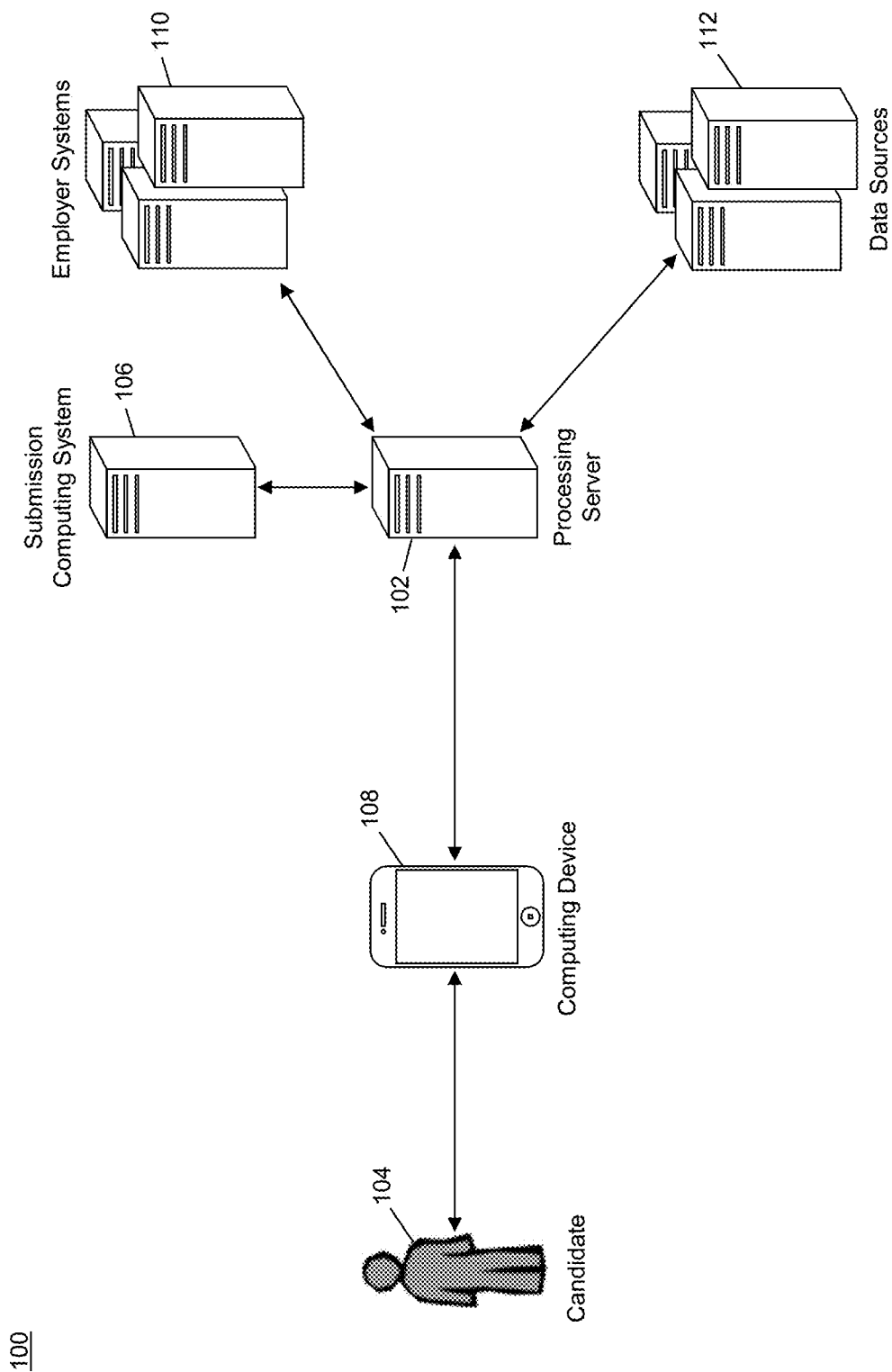
FIG. 1 is a block diagram illustrating a high level system architecture for providing candidate recommendations for open positions in accordance with exemplary embodiments.

FIG. 1 illustrates a system 100 for providing candidate hiring recommendations for an open position through a combination of textual analysis and comparative analysis.

The system 100 may include a processing server 102. The processing server 102, discussed in more detail below, may be configured to analyze open positions, past employment experiences, candidate profiles, writing samples, and other data to provide detailed and accurate recommendations regarding hiring potential candidates for a position and matching available candidates to open positions. As illustrated in the system 100, a candidate 104 may be interested in new employment. As part of their interest, the candidate 104 may, using a computing device 108, submit information for their candidacy for open positions. The information submitted may include any information that may be used for providing a recommendation of the candidate 104 for the position by the processing server 102 as discussed herein, which may include at least one or more text submissions (e.g., writing samples, prompt answers, etc.) and one or more culture markers, as discussed below. The information may also include any other information used for determining eligibility and match with open positions, such as a resume, cover letter, employment experience, education experience, demographic information, address, residency, etc. The computing device 108 may be any computing device specially configured for performing the functions discussed herein, such as a specially configured laptop computer, desktop computer, notebook computer, tablet computer, smart phone, etc.

In the system 100, a submission computing system 106 may submit information regarding an open position for which hiring recommendations are requested. The submission computing system 106 may be a specially configured computing system associated with an employer, through which a user may submit open position information to the processing server 102 using any suitable communication network and method, such as via an application programming interface or a web page. The processing server 102 may receive the submission, which may include one or more criteria values for the position and a plurality of employer culture markers. The criteria values may include any criteria provided by the employer for use in recommending and matching potential candidates 104. For instance, criteria may include experience requirements, education requirements, problem solving ability, interests, etc. The culture markers may be values identifying the culture of an employer. Employer culture markers may reference culture of the employer or culture of its desired employees, whereas candidate culture markers may make reference to the candidate's own culture or desired culture for a prospective employer, or be related to traits of desired employees or employers. For instance culture markers can include best practices, external awareness, creating buy-in, delegating and empowering, decisiveness, development, performance management, relationship building, well-oiled machines, trailblazers, savvy sellers, powerhouses, academies, academics, deal makers, brand builders, artisans, etc.

In traditional systems, the processing server 102 would attempt to match a candidate 104 to an open position purely on their submitted data and the criteria provided by the submission computing system 106, such as ensuring that the candidate 104 has proper education and experience for the position with little or nothing more. In the system 100, the processing server 102 may consider the candidate's values as well as the position's criteria, as well as the candidate's problem solving skills and the matching of the cultures.

For the problem solving skills, the processing server 102 may analyze text submissions provided by the candidate 104 as part of their application with the processing server 102. Analysis of the text submissions may include viewing each sentence of the text submissions and looking for the use of generalizations or abstractions from specific situations (e.g., indicative of a high problem solving skill), avoiding the use of colloquialisms and platitudes (e.g., indicative of a high problem solving skill), being less self-centric when describing work in business or part of a team (e.g., indicative of a high problem solving skill), and other information that may be derived from social psychological research on problem solving. An algorithm may be applied to the text submissions that may utilize the above to assign a problem solving proficiency level to each sentence in the text submissions. The processing server 102 may then compare the assigned problem solving proficiency levels to determine a percentage score for each proficiency level. For instance, the candidate's submissions' sentences may have 75% assigned a "high" proficiency level and 25% assigned a "low" proficiency level (e.g., where only two levels are used). In such cases, the proficiency level may be assigned to the candidate via the two proportions, may be given an overall level (e.g., "high" for the candidate 104 with a majority of sentences being assigned the high proficiency level), or a score on a scale of 1 to 100 with the number matching the percentage of high proficiency level sentences.

The processing server 102 may also analyze the culture markers submitted by the candidate 104 and compare those to the culture markers set for the open position by the submission computing system 106. The processing server 102 may determine a score for the candidate's match with the open position based on the analysis. For instance, the candidate 104 (e.g., via the computing device 108) and employer (e.g., via the submission computing system 106) may indicate each of the culture markers as positive or negative, or may select positive culture markers and negative culture markers from a list of potential markers. The processing server 102 may score each of the culture markers based on the indications by the candidate 104 and employer, such as where a higher score indicates that both candidate 104 and employer find the culture marker to be the same (e.g., both positive or important, or both negative or unimportant) and where a lower score indicates opposite leanings. In some cases, candidates 104 and employers may rate each marker on a scale (e.g., 1 to 10 in importance) which may be used in determining the score. The processing server 102 may then determine an overall culture match score for the candidate 104 for the position based on the matches of the cultures. For example, a candidate 104 and employer who each select the same three traits as important and match some traits as being unimportant may have a very high culture match score, while a candidate 104 and employer that have no commonality in the rankings of importance for culture markers may have a very low culture match score.

The processing server 102 may then determine a hiring recommendation for the candidate 104 for the open position based on their determined culture match score, as well as a comparison of their problem solving proficiency level and other information with the criteria set by the employer. For instance, for a position where problem solving is important, a candidate 104 with a higher problem solving proficiency level that matches the criteria for the position will have a stronger recommendation than a candidate 104 with the same criteria matching with a lower problem solving proficiency. The hiring recommendation may be represented using any suitable method or scale, such as a text indication (e.g., "recommended," "not recommended," "highly recommended," etc.) or a number scale (e.g., 1 to 100 where a higher number indicates a stronger recommendation).

In some embodiments, the processing server 102 may transmit the hiring recommendation for each candidate 104 that wants to apply for the open position to the submission computing system 106 that submitted the open position. The submission computing system 106 may then decide to contact a candidate 104 or not based on the recommendation. In some cases, the processing server 102 may offer a platform to the submission computing system 106 for contacting candidates 104. In other cases, the processing server 102 may provide contact information to the submission computing system 106, such as via the candidate's resume. In other embodiments, the processing server 102 may collect hiring recommendations for a plurality of different candidates and provide a ranking of candidates to the submission computing system 106, or provide only those candidates that have a stronger hiring recommendation (e.g., the top 5 or 10 candidates, such as may be selected by the submission computing system 106). In some instances, the hiring recommendation may include information used in determining the recommendation, such as the problem solving proficiency level, culture match score, or information that directly contributed to the recommendation.

In some embodiments, the processing server 102 may be configured to recommend open positions to a candidate 104. For instance, the candidate 104 may submit their information, culture markers, and text submissions, which may be analyzed for the candidate's problem solving proficiency level. The processing server 102 may then determine culture match scores for the candidate 104 for open positions and, based on the culture match score, the candidate's problem solving proficiency level, and other correspondence between their information and the open position's criteria, determine the candidate's hiring recommendation for each open position. The processing server 102 may inform the candidate 104, via their computing device 108, of any open positions for which there is a high hiring recommendation for the candidate 104. The candidate 104 may then instruct the processing server 102 to submit the candidate 104 for the open position, or receive contact information to contact the employer directly. In some embodiments, the processing server 102 may enable the candidate 104 to select for automatic submission of their application for employment to any open position for which their hiring recommendation exceeds a predetermined threshold. In some cases, the processing server 102 may determine a hiring recommendation for each candidate 104 in its system (e.g., that opts-in to such a service) when a new open position is submitted.

In an exemplary embodiment, the processing server 102 may be configured to enhance the criteria values for an open position based on data collected for other positions. For instance, the processing server 102 may collect data submitted by employer systems 110 and other data sources 112. The employer systems 110 may be other submission computing systems 106 and other computing systems associated with employers, from which the processing server 102 may collect data regarding open positions, filled positions, successful candidates, unsuccessful candidates, etc. The processing server 102 may use the information to assist an employer with their open position and to help select beneficial criteria. For example, an employer may be looking for a sales manager and may submit criteria values regarding their desired candidate 104, such as looking for a candidate 104 with 3-5 years of sales experience in the same or a similar industry without regard for education or other past experience, where the position is to manage sales at multiple branches in a geographic region. Other employers may have utilized the processing server 102 and provided feedback regarding successful and unsuccessful candidates 104 for their own positions. Using this data, the processing server 102 may identify that successful candidates for such a sales manager position often have additional experience in unrelated industries before getting involved in sales. The processing server 102 may provide the submission computing system 106 with such information and recommend the inclusion of a new criteria value for candidates 104 with demonstrated experience in other positions in unrelated industries. The submission computing system 106 may accept the recommendation, which may then result in different hiring recommendation that may better serve the employer based on the feedback collected by the processing server 102.

The processing server 102 may also use similar methods for expanding on information submitted by candidates 104 and strengthening candidate profiles as well as providing for more accurate hiring recommendations. For instance, candidates 104 may provide their own information, which may be used by the processing server 102 to request additional information regarding a candidate 104 from data sources 112. Data sources may include any computing systems or entities that may have additional information about a candidate 104, such as credit bureaus, governmental agencies, past employers, social networks, etc. The processing server 102 may include information gathered from the data sources 112 into a profile for the candidate 104, which may be further used in determining culture markers, problem solving proficiency levels, or candidate criteria to be used in hiring recommendations for open positions.

In some embodiments, the processing server 102 may also be configured to adjust a hiring and/or application process in real-time to provide for more accurate hiring recommendations for a position. For example, as part of an application process, the candidate 104 may, via their computing device 108, participate in a questionnaire provided by the processing server 102. The processing server 102 may be configured to adjust or change questions while the candidate 104 fills out the questionnaire based on their answers. For instance, the questionnaire may have early questions regarding experience by the candidate 104 in various industries, and may then ask more detailed questions about industries the candidate 104 has experience in to gather more detailed information for a stronger recommendation. Similarly, the processing server 102 may assist the submission computing system 106 or an associated employer with interview processes, such as by providing interview questions based on the open position criteria, the candidate's information, and feedback regarding other, similar positions, employers, or candidates 104. The processing server 102 may receive input from the submission computing system 106 during an interview process, such as answers to questions, which may be parsed for data and analyzed to identify additional or alternative questions to ask, such as described above.

The methods and systems discussed herein may provide for hiring recommendations for open positions that are significantly stronger than those used in traditional systems. By determining a candidate's problem solving proficiency and looking at their own culture traits and desired working environment, the processing server 102 can provide a more accurate recommendation and find better candidates for a position that match on more levels than just through experience and education. In addition, by collecting feedback and continually improving criteria, scoring, and determinations, the processing server 102 may be able to strengthen recommendations over time and assist employers in finding better-suited candidates 104 and help candidates 104 find positions they may be otherwise unaware of or not realize they are a strong fit for. The result is an overall better talent acquisition and candidate recommendation system.

Processing Server

Figure 2:
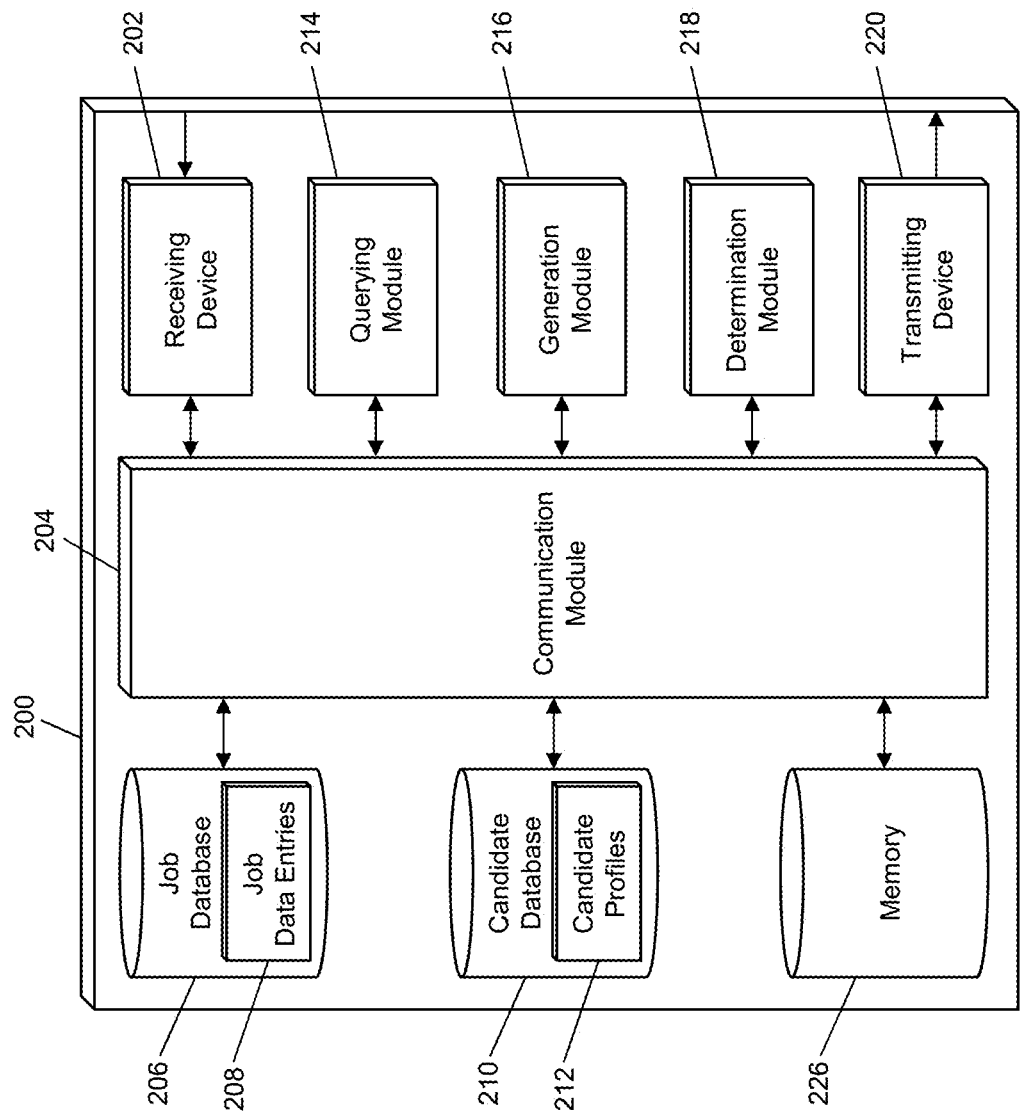
FIG. 2 is a block diagram illustrating a processing server for use in the system of FIG. 1 for providing candidate recommendations in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. The computing device 108 or submission computing system 106 may be implemented using the components of the processing server 102 as illustrated in FIG. 2 and discussed below.

The processing server 102 may include a receiving device 202. The receiving device 202 may be configured to receive data over one or more networks via one or more network protocols. In some instances, the receiving device 202 may be configured to receive data from submission computing systems 106, computing devices 108, employer systems 110, data sources 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 108 that may be superimposed or otherwise encoded with candidate information, which may include document submissions, text submissions, candidate culture markers, resumes, cover letters, education, employment history, demographics, etc. The receiving device 202 may also be configured to receive data signals electronically transmitted by submission computing systems 106, which may be superimposed or otherwise encoded with information regarding an open position, which may include at least a plurality of employer culture markers and one or more job criteria values. The receiving device 202 may be further configured to receive data signals electronically transmitted by employer systems 110 and data sources 112 that may be superimposed or otherwise encoded with position feedback, candidate feedback, candidate information, data requests, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, determination module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a job database 206. The job database 206 may be configured to store a job data entries 208 using a suitable data storage format and schema. The job database 206 may be a relational database that utilizes structured query language for the storage, identification, modifying, updating, accessing, etc. of structured data sets stored therein. Each job data entry 208 may be a structured data set configured to store data related to an open position or previously opened position, and may include one or more job criteria values, employer culture markers, hiring recommendations, successful candidate data, unsuccessful candidate data, etc., as discussed herein.

The processing server 102 may include a candidate database 210. The candidate database 210 may be configured to store a plurality of candidate profiles 212 using a suitable data storage format and schema. The candidate database 210 may be a relational database that utilizes structured query language for the storage, identification, modifying, updating, accessing, etc. of structured data sets stored therein. Each candidate profile 212 may be a structured data set configured to store data related to a candidate 104. A candidate profile 212 may include, for instance, candidate information, selected traits and culture markers, hiring recommendations, problem solving proficiency data, answers to prompts, application histories, culture match scores, etc.

The processing server 102 may include a querying module 214. The querying module 214 may be configured to execute queries on databases to identify information. The querying module 214 may receive one or more data values or query strings, and may execute a query string based thereon on an indicated database, such as the job database 206, to identify information stored therein. The querying module 214 may then output the identified information to an appropriate engine or module of the processing server 102 as necessary. The querying module 214 may, for example, execute a query on the job database 206 to insert a new job data entry 208 for a new open position submitted to the processing server 102, or to identify job data entries 208 that a new candidate 104 may have matching criteria with for use in determining culture match scores and hiring recommendations.

The processing server 102 may also include a generation module 216. The generation module 216 may be configured to generate data for the processing server 102 as part of the functions discussed herein. The generation module 216 may receiving instructions as input, may perform generate data as instructed, and may output the generated data to another module or engine of the processing server 102. In some cases, data to be used in the generation may be included in the input. In some instances, the generation module 216 may be configured to identify data for use in the requested generation, such as by instructing the querying module 214 to perform one or more queries for data. The generation module 216 may, for example, be configured to generate prompts, data requests, questionnaires, culture markers, and other data to be used in collecting information on candidates 104, open positions, filled positions, etc. and for use in determining hiring recommendations.

The processing server 102 may also include a determination module 218. The determination module 218 may be configured to perform determinations for the processing server 102 as discussed herein. The determination module 218 may receive instructions as input, may make a determination as instructed, and output a result of the determination to another module or engine of the processing server 102. In some cases, the input to the determination module 218 may include data for use in the determination. In some instances, the determination module 218 may be configured to identify additional data to be used in the determination, such as through instructing the querying module 214 to query databases or memory for the additional data. The determination module 218 may be configured to, for instance, determine culture match scores by comparing culture markers, determine problem solving proficiency levels by analyzing text submissions and prompt responses, and determine hiring recommendations as discussed herein.

The processing server 102 may also include a transmitting device 220. The transmitting device 220 may be configured to transmit data over one or more networks via one or more network protocols. In some instances, the transmitting device 220 may be configured to transmit data to submission computing systems 106, computing devices 108, employer systems 110, data sources 112, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to submission computing systems 106 that may be superimposed or otherwise encoded with hiring recommendations, candidate information, candidate rankings, requests for candidate data, recommendations for criteria values, etc. The transmitting device 220 may also be configured to electronically transmit data signals to computing devices 108, which may be superimposed or otherwise encoded with position recommendations, requests for additional data, requests for text submissions, question prompts, etc. The transmitting device 220 may also be configured to electronically transmit data signals to employer systems 110 and data sources 112 that may be superimposed or otherwise encoded with requests for data, such as past candidate data, job criteria values, candidate information, etc.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, application program interface data, algorithms for problem solving proficiency determinations, culture traits and marker data, questionnaires, prompts, etc.

Process for Providing Candidate Recommendations

Figure 3A:
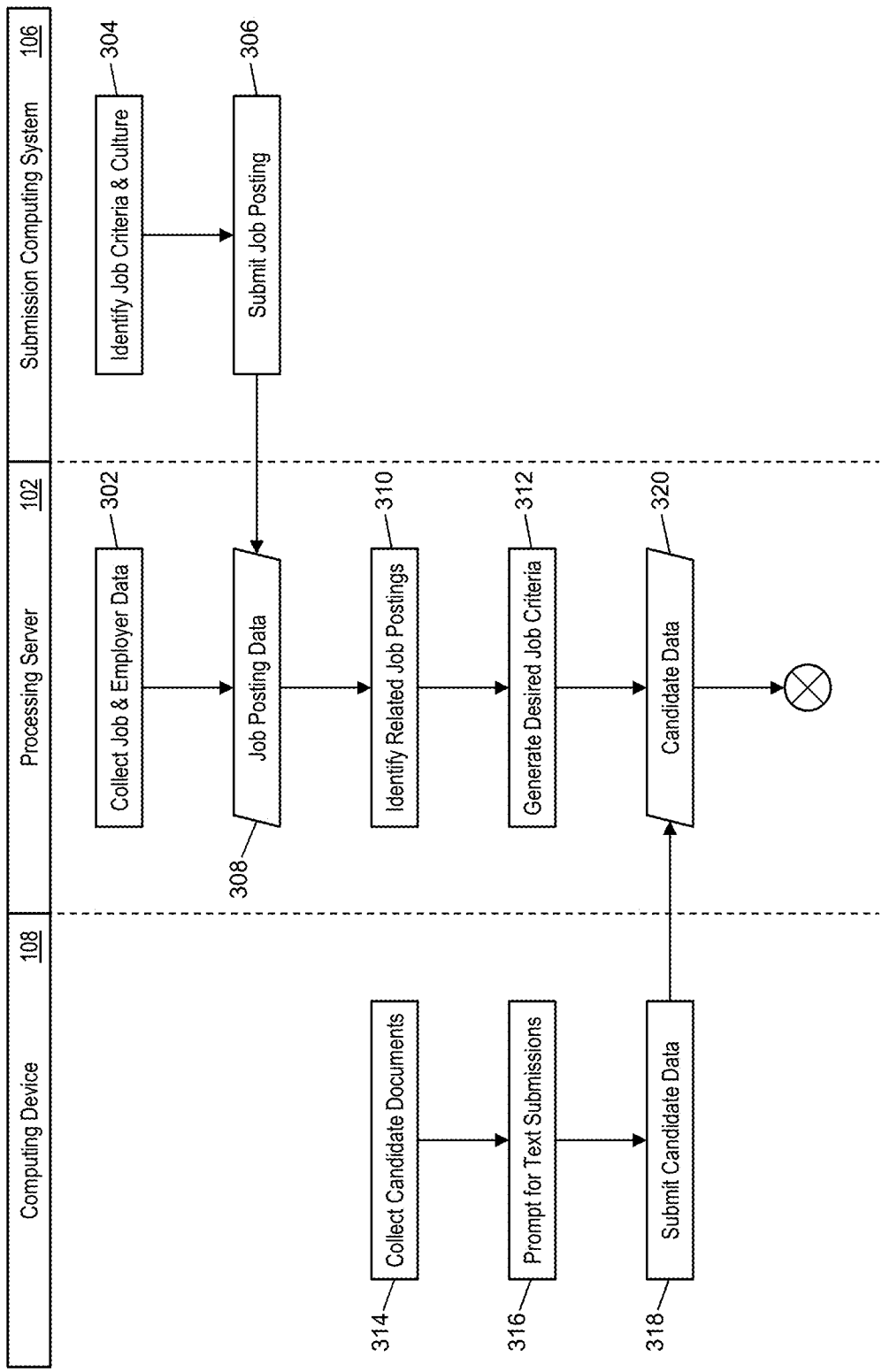
FIGS. 3A and 3B are a process flow illustrating a process for providing candidate recommendations for an open position in the system of FIG. 1 in accordance with exemplary embodiments.
Figure 3B:
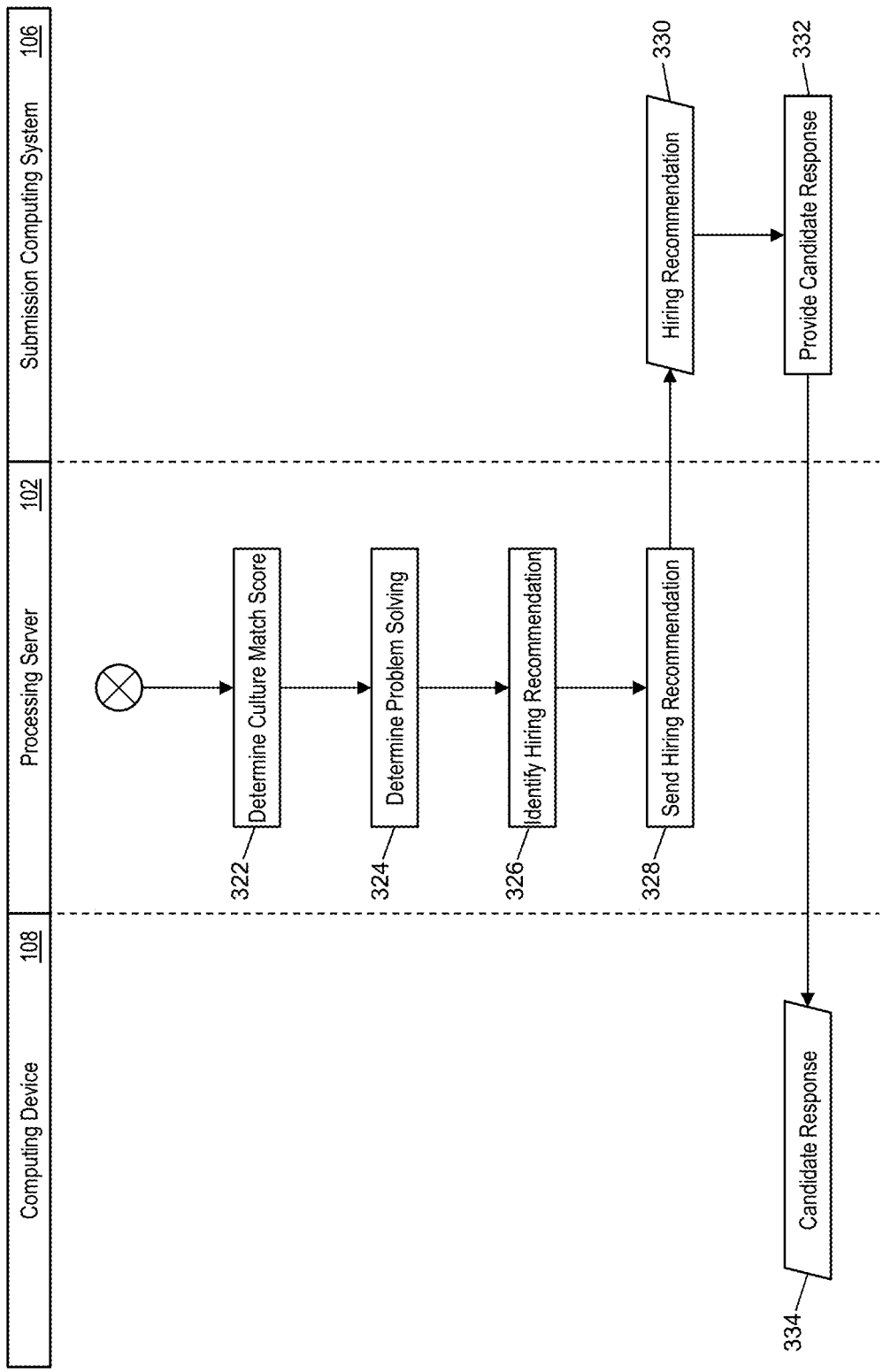

FIGS. 3A and 3B illustrate a process for determining a hiring recommendation for a potential candidate 104 for an open position submitted by the submission computing system 106 to the processing server 102 in the system 100 of FIG. 1.

In step 302, the processing server 102 may collect information regarding job criteria values for different positions, information regarding successful and unsuccessful candidates, information on potential candidates 104, etc., such as from employer systems 110 and data sources 112, which may be stored in the job database 206 in job data entries 208, in the candidate database 210 in candidate profiles 212, and the memory 226 of the processing server. In step 304, the submission computing system 106 may prompt a user thereof to make selections regarding job criteria values for a new open position for which the associated employer wants candidates 104 as well as a selection of employer culture markers. In some cases, the selections may be made through a web page, application programming interface, or application program of the processing server 102 accessed by the submission computing system 106. In step 306, the job posting information may be submitted to the processing server 102 by the submission computing system 106 using a suitable communication network and method. In step 308, the receiving device 202 of the processing server 102 may receive the job criteria values and employer culture markers for the open position.

In step 310, the querying module 214 of the processing server 102 may identify a plurality of related job postings by executing a query on the job database 206 of the processing server 102 to identify job data entries 208 that include similar or matching job criteria values. For instance, the processing server 102 may identify past job data entries 208 for jobs having similar descriptions, scopes, and from similar employers (e.g., company sizes, geographic locations, industries, etc.). In step 312, the generation module 216 of the processing server 102 may generate additional or alternative job criteria values for the open position based on feedback data and other information in the identified job data entries 208. In some instances, the processing server 102 may seek confirmation of the newly generated job criteria values from the submission computing system 106.

In step 314, the computing device 108 may collect documents from the candidate 104 for use in submitting an application for the open position. The documents may include, for instance, a resume, cover letter, transcripts, recommendation letters, proof of employment letters, licenses, etc. In step 316, the computing device 108 may prompt the candidate 104 for text submissions, such as by presenting questions to the candidate 104 for answering (e.g., which may be supplied by the processing server 102 based on the results of step 312) or by requesting writing samples from the candidate 104. In step 318, the computing device 108 may submit the candidate information for the candidate 104 to the processing server 102 as part of an application for the open position using a suitable communication network and method. In step 320, the receiving device 202 of the processing server 102 may receive the candidate data, which may include all of the candidate values, a plurality of candidate culture markers, and one or more text submissions.

In step 322, the determination module 218 of the processing server 102 may determine a culture match score for the candidate 104 for the open position by comparing the culture markers submitted by the candidate 104 with those selected by the submission computing system 106 in its submission for the open position. In step 324, the determination module 218 of the processing server 102 may determine a problem solving proficiency level for the candidate 104 by applying algorithms stored in the memory 226 of the processing server 102 to the text submissions received from the candidate's computing device 108. In step 326, the determination module 218 of the processing server 102 may determine a hiring recommendation for the candidate 104 based on the culture match score as well as a comparison of the candidate's problem solving proficiency level and own candidate values with the job criteria values identified for the open position.

In step 328, the transmitting device 220 of the processing server 102 may electronically transmit the hiring recommendation for the candidate 104, as well as contact information and other information for the candidate 104, with the candidate's consent, to the submission computing system 106 using a suitable communication network and method. In step 330, the submission computing system 106 may receive the recommendation for the candidate 104 and other candidate information. In step 332, the submission computing system 106 may, with assistance of users thereof associated with the related employer, may determine a response for the candidate's application for the position based on at least the provided hiring recommendation. In step 334, the computing device 108 may receive the response from the submission computing system 106, which may be displayed to the candidate 104 as a user thereof. For example, the submission computing system 106 may inform the candidate 104 that they are accepted for the position, denied for the position, or wanted for an interview or to provide additional information.

Exemplary Method for Providing Candidate Recommendations

Figure 4:
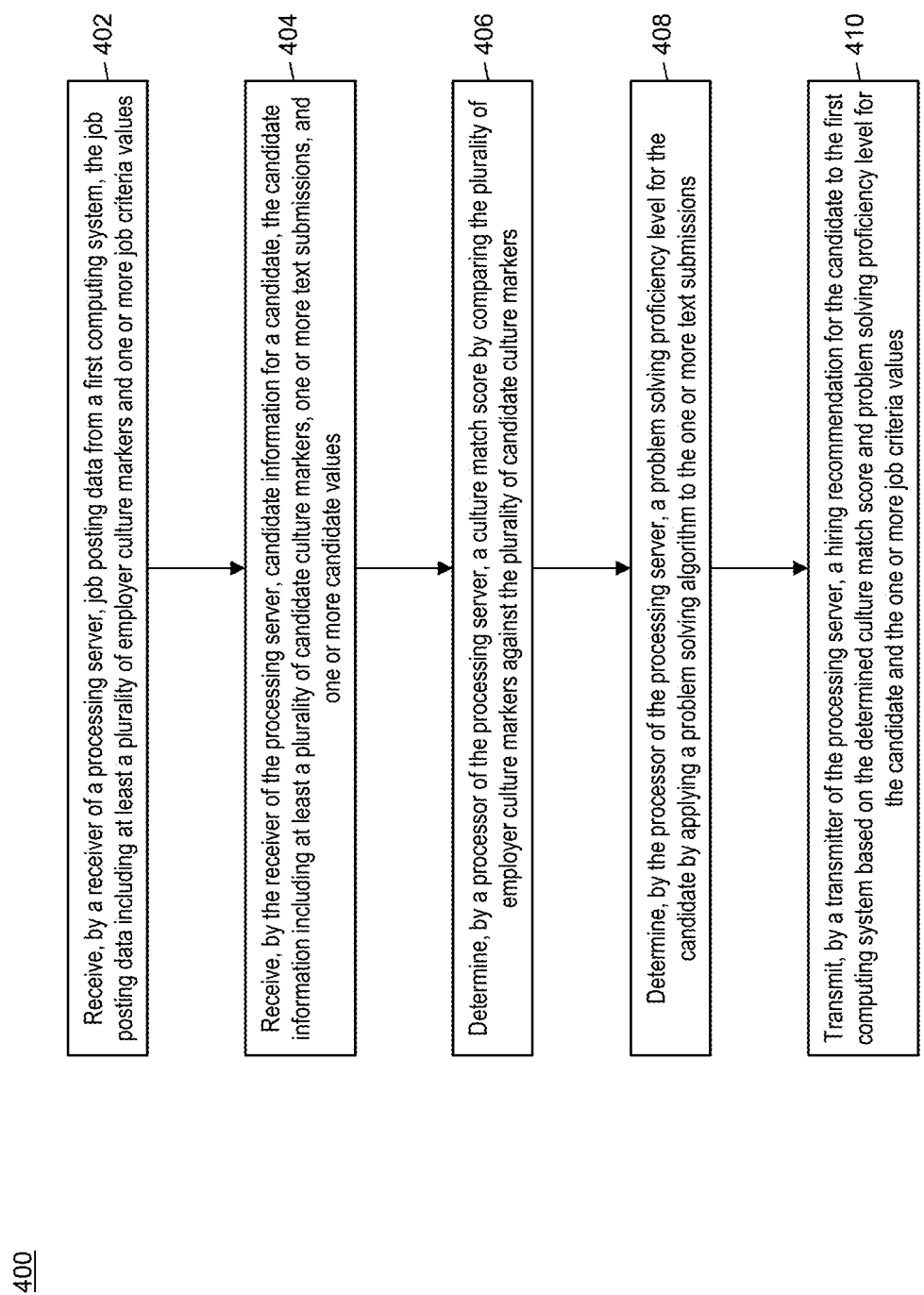
FIG. 4 is a flow chart illustrating an exemplary method for providing candidate recommendations for an open position based on problem solving proficiency and culture matching in accordance with exemplary embodiments.

FIG. 4 illustrates a method 400 for providing candidate recommendations for an open position based on problem solving proficiency and culture matching.

In step 402, job posting data may be received by a receiver (e.g., the receiving device 202) of a processing server (e.g., the processing server 102) from a first computing system (e.g., the submission computing system 106), where the job posting data including at least a plurality of employer culture markers and one or more job criteria values. In step 404, candidate information for a candidate (e.g., the candidate 104) may be received by the receiver of the processing server, the candidate information including at least a plurality of candidate culture markers, one or more text submissions, and one or more candidate values.

In step 406, a culture match score may be determined by a processor (e.g., the determination module 218) of the processing server by comparing the plurality of employer culture markers against the plurality of candidate culture markers. In step 408, a problem solving proficiency level may be determined by the processor (e.g., determination module 218) of the processing server for the candidate by applying a problem solving algorithm to the one or more text submissions. In step 410, a hiring recommendation for the candidate may be transmitted by a transmitter (e.g., the transmitting device 220) of the processing server to the first computing system based on the determined culture match score and problem solving proficiency level for the candidate and the one or more job criteria values.

In one embodiment, the method 400 may further include: receiving, by the receiver of the processing server, candidate information for a plurality of additional candidates; repeating, by the processing server, the determining steps and the transmitting step for each of the plurality of additional candidates. In a further embodiment, the method 400 may even further include: determining, by the processor of the processing server, a recommendation order for the candidate and each of the plurality of additional candidates based on the hiring recommendation for the respective candidate; and transmitting, by the transmitter of the processing server, the recommendation order to the first computing system. In some embodiments, applying the problem solving algorithm to the one or more text submissions may include identifying, for each sentence in the one or more text submissions, a problem solving proficiency, and the problem solving proficiency level may be based on a ratio of the identified problem solving proficiency for each sentence in the one or more text submissions.

In one embodiment, the problem solving proficiency level may be measured as low or high. In some embodiments, the culture match score may be represented on a scale of low, medium, or high. In one embodiment, the method 400 may also include: storing, in a memory (e.g., memory 226) of the processing server, job criteria data for a plurality of alternative job listings; and determining, by the processor of the processing server, one or more ideal criteria based on a combination of the one or more job criteria values and the job criteria data, wherein the hiring recommendation is further based on the one or more candidate values and the determined one or more ideal criteria. In some embodiments, the hiring recommendation may be further based on the one or more candidate values and the one or more job criteria values.

Computer System Architecture

Figure 5:
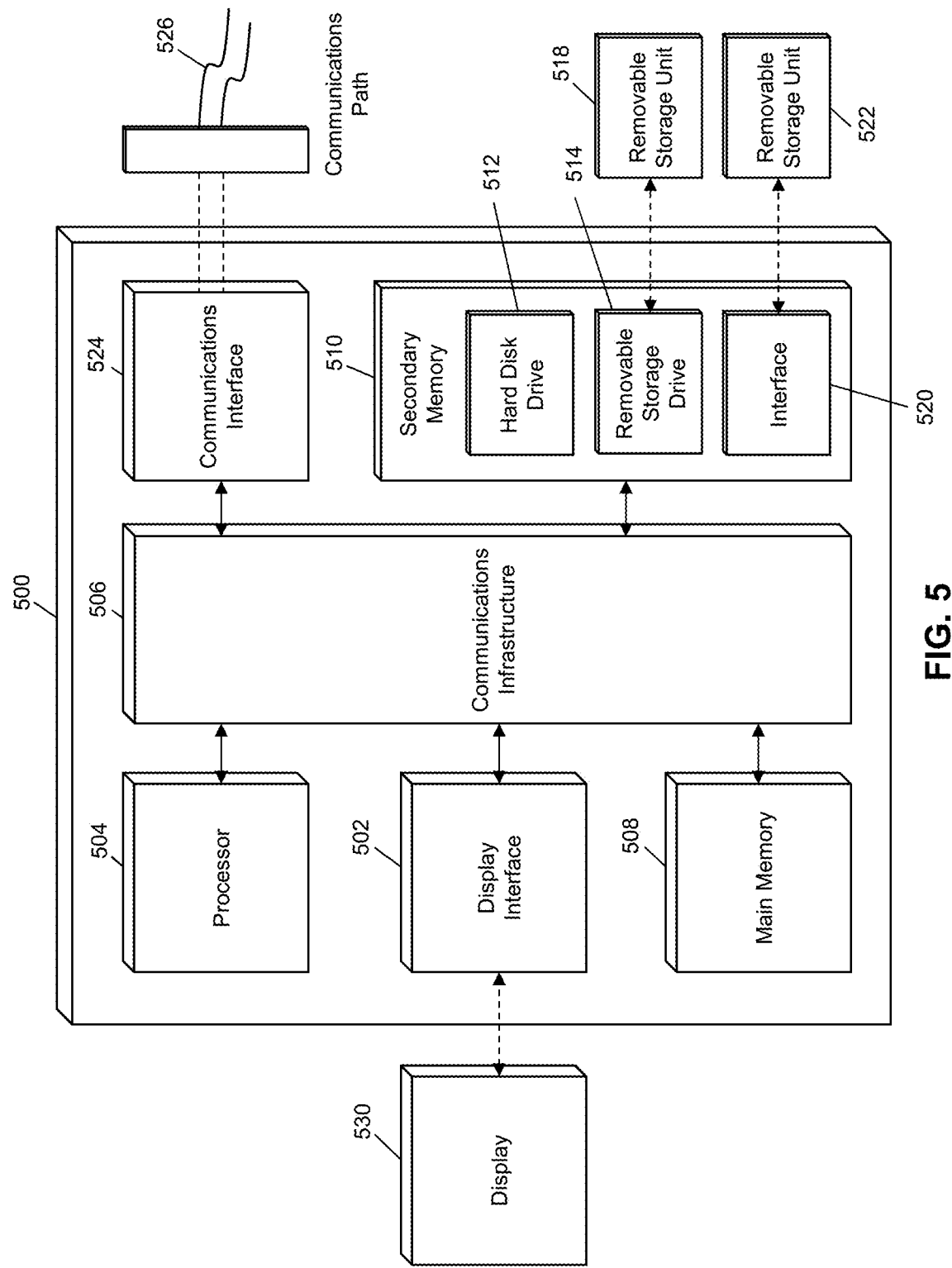
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server of FIG. 2 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for providing candidate recommendations for an open position based on problem solving proficiency and culture matching. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing candidate recommendations for an open position based on problem solving proficiency and culture matching, comprising:
receiving, by a receiver of a processing server, job posting data from a plurality of first computing systems via an application programming interface or a web page, wherein each job posting data received is associated with an open job position and includes at least a plurality of employer culture markers and one or more job criteria values;
receiving, by the receiver of the processing server, from a second computing system, candidate information for a candidate, the candidate information including at least a plurality of candidate culture markers indicating the candidate's desired culture for a prospective employer, one or more text submissions including at least one of writing samples and prompt answers, and one or more candidate values;
determining, by a processor of the processing server, a culture match score by comparing the plurality of employer culture markers included in each job posting data received from the plurality of first computing systems against the plurality of candidate culture markers included in the candidate information received from the second computing system;
analyzing, by the processor of the processing server, each sentence in the one or more text submissions, wherein said analyzing includes (1) searching for use of generalizations or abstractions from specific situations, (2) identifying avoidance of use of colloquialisms and platitudes, (3) identifying instances in which the candidate is less self-centric when describing work in business or part of a team;
based on said analysis of each sentence in the one or more text submissions, determining, by the processor of the processing server, a problem solving proficiency level for each sentence in the one or more text submissions for the candidate, wherein the problem solving proficiency level is based on a ratio of the identified problem solving proficiency for each sentence in the one or more text submissions;
determining, by the processor of the processing server, a hiring recommendation for the candidate for each open job position based on (i) the determined culture match score and determined problem solving proficiency level for the candidate, and (ii) one or more job criteria values,
transmitting, by a transmitter of the processing server, the determined hiring recommendation for the candidate to the at least one first computing system from the plurality of first computing systems;
providing, by the processing server, a platform by which at least one the first computing system contacts recommended candidates; and
automatically submitting, by the transmitter of the processing server, an application for employment for the candidate to any open position for which the determined hiring recommendation for the candidate exceeds a predetermined threshold.

2. The method of claim 1, further comprising:
receiving, by the receiver of the processing server, candidate information for a plurality of additional candidates;
repeating, by the processing server, the determining steps and the transmitting step for each of the plurality of additional candidates.

3. The method of claim 2, further comprising:
determining, by the processor of the processing server, a recommendation order for the candidate and each of the plurality of additional candidates based on the hiring recommendation for the respective candidate; and
transmitting, by the transmitter of the processing server, the recommendation order to the first computing system.

4. The method of claim 1, wherein the problem solving proficiency level is measured as low or high.

5. The method of claim 1, wherein the culture match score is represented on a scale of low, medium, or high.

6. The method of claim 1, further comprising:
storing, in a memory of the processing server, job criteria data for a plurality of alternative job listings; and
determining, by the processor of the processing server, one or more ideal criteria based on a combination of the one or more job criteria values and the job criteria data, wherein
the hiring recommendation is further based on the one or more candidate values and the determined one or more ideal criteria.

7. The method of claim 1, wherein the hiring recommendation is further based on the one or more candidate values and the one or more job criteria values.

8. A system for providing candidate recommendations for an open position based on problem solving proficiency and culture matching, comprising:
- a plurality of first computing systems;
- a second computing system; and
- a processing server, the processing server including
  - a receiver receiving
    - job posting data from the plurality of first computing systems, via an application programming interface or a web page, wherein each job posting data received is associated with an open job position and includes at least a plurality of employer culture markers and one or more job criteria values, and
    - candidate information for a candidate, from the second computing system, the candidate information including at least a plurality of candidate culture markers, one or more text submissions, and one or more candidate values,
  - a processor
    - determining a culture match score by comparing the plurality of employer culture markers included in each job posting data received from the plurality of first computing systems against the plurality of candidate culture markers included in the candidate information received from the second computing system,
    - analyzing each sentence in the one or more text submissions, wherein said analyzing includes (1) searching for use of generalizations or abstractions from specific situations, (2) identifying avoidance of use of colloquialisms and platitudes, (3) identifying instances in which the candidate is less self-centric when describing work in business or part of a team,
    - determining, based on said analysis of each sentence in the one or more text submissions, a problem solving proficiency level for each sentence in the one or more text submissions for the candidate, wherein the problem solving proficiency level is based on a ratio of the identified problem solving proficiency for each sentence in the one or more text submissions,
    - determining a hiring recommendation for the candidate for each open job position based on (i) the determined culture match score and problem solving proficiency level for the candidate, and (ii) one or more job criteria values, and
  - a transmitter
    - transmitting the determined hiring recommendation for the candidate to at least one first computing system from the plurality of first computing systems, wherein the processing server further provides a platform by which the first computing system contacts recommended candidates, and
    - automatically submitting an application for employment for the candidate to any open position for which the determined hiring recommendation for the candidate exceeds a predetermined threshold.

9. The system of claim 8, wherein
the receiver of the processing server further receives candidate information for a plurality of additional candidates, and
the processing server repeats the determining steps and the transmitting step for each of the plurality of additional candidates.

10. The system of claim 9, wherein
the processor of the processing server further determines a recommendation order for the candidate and each of the plurality of additional candidates based on the hiring recommendation for the respective candidate, and
the transmitter of the processing serve further transmits the recommendation order to the first computing system.

11. The system of claim 8, wherein the problem solving proficiency level is measured as low or high.

12. The system of claim 8, wherein the culture match score is represented on a scale of low, medium, or high.

13. The system of claim 8, wherein
the processing server further includes a memory storing job criteria data for a plurality of alternative job listings,
the processor of the processing server further determines one or more ideal criteria based on a combination of the one or more job criteria values and the job criteria data, and
the hiring recommendation is further based on the one or more candidate values and the determined one or more ideal criteria.

14. The system of claim 8, wherein the hiring recommendation is further based on the one or more candidate values and the one or more job criteria values.

* * * * *